United States Patent
Zhu

(10) Patent No.: US 8,265,622 B2
(45) Date of Patent: Sep. 11, 2012

(54) METHOD AND SAVING ENTITY FOR SETTING SERVICE

(75) Inventor: Lei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 12/611,204

(22) Filed: Nov. 3, 2009

(65) Prior Publication Data
US 2010/0048195 A1  Feb. 25, 2010

Related U.S. Application Data

(63) Continuation of application No. PCT/CN2008/072026, filed on Aug. 18, 2008.

(30) Foreign Application Priority Data

Aug. 21, 2007 (CN) .......................... 2007 1 0145102

(51) Int. Cl.
*H04W 4/00* (2009.01)
*H04L 12/66* (2006.01)
*G06F 15/16* (2006.01)

(52) U.S. Cl. ...................... 455/433; 455/435.1; 370/352; 370/353; 709/228

(58) Field of Classification Search .............. 455/414.1, 455/435.1, 432.3, 433; 709/228; 370/352, 370/353
See application file for complete search history.

(56) References Cited

U.S. PATENT DOCUMENTS

| | | | |
|---|---|---|---|
| 2004/0242229 A1 | 12/2004 | Okazaki | |
| 2006/0018272 A1* | 1/2006 | Mutikainen et al. | 370/328 |
| 2007/0088836 A1 | 4/2007 | Tai et al. | |
| 2008/0020789 A1 | 1/2008 | Yan et al. | |
| 2008/0176538 A1 | 7/2008 | Terrill et al. | |
| 2008/0256117 A1* | 10/2008 | Laurila et al. | 707/102 |
| 2008/0281971 A1* | 11/2008 | Leppanen et al. | 709/228 |
| 2009/0023443 A1* | 1/2009 | Kieselmann et al. | 455/433 |
| 2009/0201913 A1* | 8/2009 | Levy et al. | 370/352 |

FOREIGN PATENT DOCUMENTS

| | | |
|---|---|---|
| CN | 1575021 | 2/2005 |
| CN | 1893722 A | 1/2007 |
| WO | 2006117323 A1 | 11/2006 |

OTHER PUBLICATIONS

J. Rosenberg, et al., "SIP: Session Initiation Protocol", Jun. 1, 2002, pp. 1-269.

(Continued)

*Primary Examiner* — George Eng
*Assistant Examiner* — Nam Huynh
(74) *Attorney, Agent, or Firm* — Staas & Halsey LLP

(57) ABSTRACT

A service setting method and a service setting saving entity are disclosed in order to solve the problem that it is impossible to perform distinctive settings according to the equipments in a scenario that one user has several equipments. The method includes the following steps: a service setting saving entity receives user setting information, a user identifier, user equipment (UE) setting information, and UE identifiers uploaded by user terminals (UTs) of the same user, and the service setting saving entity bindingly saves the user setting information and the user identifiers, and bindingly saves the UE identifier and the UE setting information of the same UT. Due to the corresponding binding saving, the equipments can be set distinctively.

14 Claims, 4 Drawing Sheets

OTHER PUBLICATIONS

MMusic WG Schelzrinne/Rosenberg Columbia U/Bell Laboratories, "SIP Caller Preferences and Callee Capabilities; draft-ietf-mmusic-sip-caller-00.text", IETF Standard-Working-Draft, Internet Engineering Task Force, vol. Mmusic, Feb. 26, 1999, pp. 1-16.

European Search Report issued on Jul. 23, 2010 in a corresponding European patent application.

Schulzrinne et al., *SIP Caller Preferences and Callee Capabilities*, Internet Engineering Task Force, Feb. 26, 1999, pp. 1-16.

Rosenburg, J. et al., *SIP: Session Initiation Protocol*, Network Working Group, The Internet Society, Jun. 2002, pp. 1-8, 12, 13, 35, 36, 56-66, and 167.

The IMS: IP Multimedia Concepts and Services in the Mobile Domain, Mar. 2005, pp. VI-XVI, 29, 30, 75, 76, 84, and 85.

Office Action, mailed Dec. 9, 2010, in corresponding Chinese Application No. 200710145102.2 (15 pp.).

Written Opinion of the International Searching Authority, mailed Nov. 28, 2008, in corresponding International Application No. PCT/CN2008/072026 (3 pp.).

Second Office Action, mailed May 18, 2011, in corresponding Chinese Application No. 200710145102.2 (16 pp.).

Rejection Decision, mailed Sep. 8, 2011, in corresponding Chinese Application No. 200710145102.2 (20 pp.).

* cited by examiner

METHOD AND SAVING ENTITY FOR SETTING SERVICE

CROSS-REFERENCE TO RELATED APPLICATIONS

This application is a continuation of International Patent Application No. PCT/CN2008/072026, filed on Aug. 18, 2008, which claims priority to Chinese Patent Application No. 200710145102.2, filed on Aug. 21, 2007. The contents of the above identified applications are incorporated by reference herein in their entireties.

FIELD OF THE TECHNOLOGY

The present invention relates to the field of communication, and more particularly to a service setting method and a service setting saving entity.

BACKGROUND

In applications based on an internet protocol (IP) multimedia subsystem (IMS), a user employs services provided by an IMS service platform in a subscription manner. An identifier of the IMS service employed by the user is a uniform resource identifier (URI), for example, a session initiation protocol (SIP) URI or a telephone (TEL) URI, each of which is a type of user identifier.

Almost all the applications before are in scenarios that a single user equipment (UE) is connected to the IMS and employs services based on the IMS. In an existing application system, possible applications include a push to talk over cellular (PoC) service, an instant message (IM) service, a convergent IP messaging (CPM) service, an extensible markup language (XML) document management (XDM) engine, a presentation service, and the like. With the increase of service types, it is possible that other services may also be applied in an IMS-based system.

In the applications listed above, service information needs to be set according to the user's will. In an open mobile alliance (OMA) PoC service, a PoC terminal is able to perform service settings on a participation function of a PoC server that the user belongs to. Such service settings adopt an SIP. PUBLISH message type, and upload the setting information of the user on the server. The setting information is separately saved according to different users, which can be distinguished by using user identifiers. The setting information may include answer mode setting, session barring setting, instant notification message, concurrent session setting, called party identifier information setting, media content setting, text content setting, PoC Box setting, and the like. As the SIP PUBLISH message type is characterized in having periodicity, the setting information saved in such a manner has certain time effect. According to the definition of the OMA PoC service, service settings start after a user terminal (UT) completes a service registration. For the service settings, after the service is deregistered, setting information of the user may be deleted automatically.

In the OMA PoC service, another user setting manner also exists. By using the capacity of an XDM engine, a UT employs an XDM client (XDMC) to set setting information saved for a long term via an XML configuration access protocol (XCAP) on an XDM server (XDMS). The setting information is, for example, user access policy, general access policy, and the like. This part of setting information is characterized in being saved for a long term.

In other services, scenarios widely occur that service information setting is performed by a UT for certain services. For example, the UTs may be set differently, and in current applications, these scenarios are distinguished for different users or according to a certain user.

In an existing service information setting method, all the service settings are saved for a certain user, and corresponding settings are performed according to the settings of the user during application. When several equipments belonging to one user are used in various application scenarios, such a service setting manner is unable to meet the use requirement. For example, as these equipments have different capabilities, the settings thereof in a certain service must differ from each other to some extent. Among the service settings of one user, a part of the service settings represents the user's will, and is independent from the usage of the user's UE, which is, for example, an answer mode. In addition, the service settings of one user may also vary according to different service terminals. For example, UTs with a camera and without a camera definitely support different media types.

Therefore, in a scenario that one user has several equipments, the service setting manner performed by a user in the prior art is unable to set distinctively according to the equipments, and thus fails to meet the use requirements.

SUMMARY

In order to solve the problem that the service setting manner performed by a user in the prior art is unable to set distinctively according to the equipments and thus fails to meet the use requirements in a scenario that one user has several equipments, a service setting method is provided in an embodiment of the present invention, and the method includes the following:

A service setting saving entity receives user setting information, a user identifier, user equipment (UE) setting information, and UE identifiers uploaded by user terminals (UTs) of the same user; and the service setting saving entity bindingly saves the user setting information and the user identifier, and bindingly saves the UE identifier and the UE setting information of the same UT.

A service setting saving entity is also provided in an embodiment of the present invention, and the service setting saving entity includes:

a receiving module adapted to receive user setting information, a user identifier, user equipment (UE) setting information, and UE identifiers uploaded by user terminals (UTs) of the same user; and a saving module adapted to bindingly save the user setting information and the user identifiers, and bindingly save the UE identifier and the UE setting information of the same UT.

Seen from the above implementations of the present invention, as the UE identifier and the UE setting information of the same user are bindingly saved, the equipments can be set distinctively in a scenario that one user has several equipments.

A service setting method is further provided in an embodiment of the present invention, and the method includes the following:

A service setting saving entity receives setting information sent by user terminals (UTs) of the same user, in which the setting information includes equipment identifiers; and the service setting saving entity saves the setting information.

A service setting saving entity is further provided in an embodiment of the present invention, and the service setting saving entity includes:

a receiving module adapted to receive setting information sent by user terminals (UTs) belonging to the same user, in which the setting information includes equipment identifiers; and a saving module adapted to save the setting information.

In view of the above, the service setting method and the service setting saving entity save a plurality of equipment identifiers, and each equipment identifier is adapted to distinguish different equipments, so that the equipments can be set distinctively in a scenario that one user has several equipments.

DETAILED DESCRIPTION

In an embodiment of the present invention, a service setting method is provided, and the method includes: A service setting saving entity receives user setting information, a user identifier, user equipment (UE) setting information, and UE identifiers uploaded by user terminals (UTs) of the same user; the service setting saving entity bindingly saves the user setting information and the user identifiers, and bindingly saves the UE identifier and the UE setting information of the same UT. As the UE identifier and the UE setting information of the same user are bindingly saved, the equipments can be distinctively set in a scenario that one user has several equipments. In addition, in an embodiment of the present invention, a service setting method is also provided, and the method includes: A service setting saving entity receives setting information sent by UTs belonging to the same user, in which the setting information includes a plurality of equipment identifiers; and the service setting saving entity saves the setting information, in which the setting information further includes a user identifier. In the embodiments of the present invention, a plurality of equipment identifiers is saved, and each equipment identifier is adapted to distinguish different equipments, so that the equipments can be set distinctively in a scenario that one user has several equipments.

In addition, if the setting information also includes the user identifier, the saved and processed setting information may be distinguished according to the user identifier and the equipment identifiers, so that the equipments can be set distinctively in a scenario that one user has several equipments.

Figure 1:
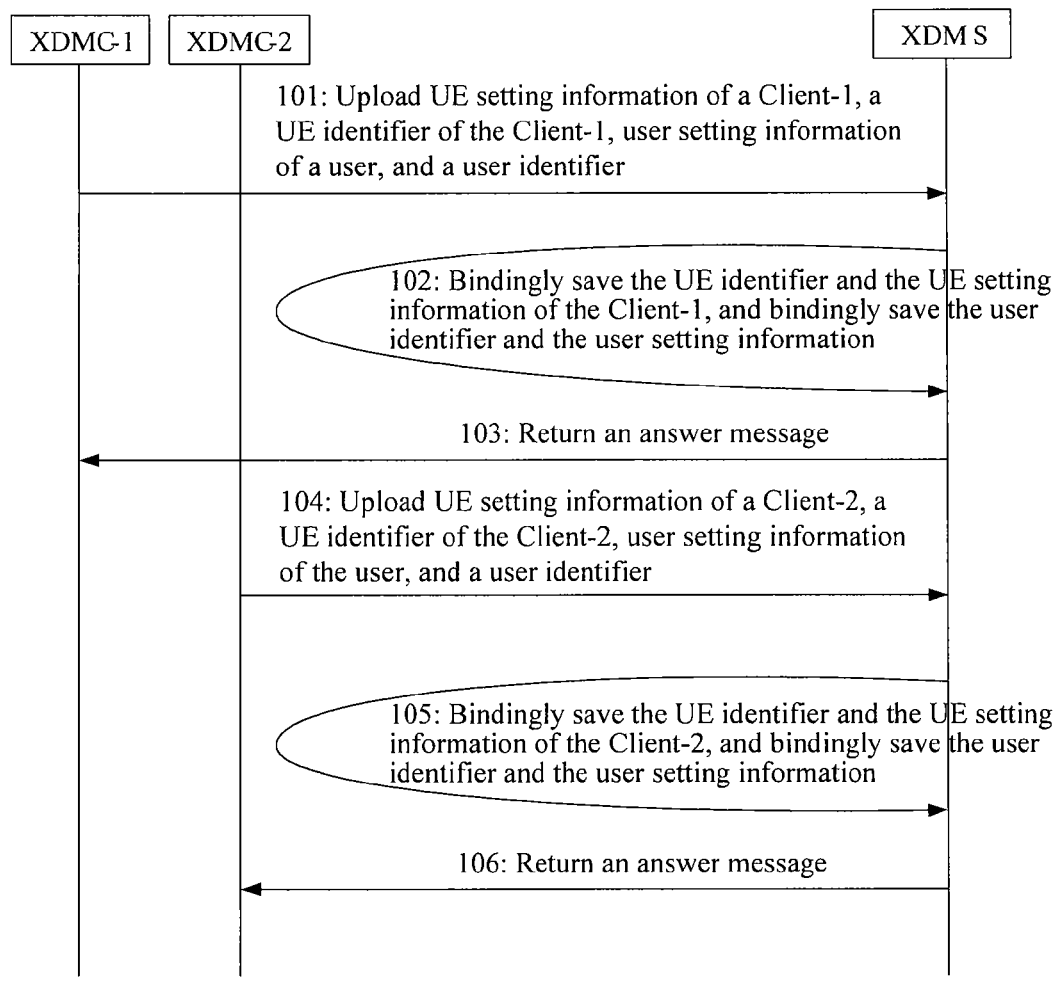
FIG. 1 is a flow chart of a method according to a first embodiment of the present invention.

In a first embodiment of the present invention, an equipment service setting method is provided. In a process that a UE adopts an extensible markup language (XML) document management (XDM) mechanism to upload setting information, the XDM mechanism bears the setting information via an XML configuration access protocol (XCAP). In this embodiment, two UTs, namely, Client-1 (i.e., XDM client (XDMC)-1) and Client-2 (i.e., XDMC-2) belonging to the same user take part in the upload of the user setting information. The process of the method is shown in FIG. 1, which includes the following steps.

Step 101: The XDMC-1 sends an XCAP PUT message to an XDM server (XDMS) as a service setting saving entity, which is adapted to upload UE setting information of the Client-1, a UE identifier of the Client-1, user setting information of the user, and a user identifier.

Step 102: The XDMS bindingly saves the UE identifier of the Client-1 and the UE setting information of the Client-1. For example, the UE identifier of the Client-1 and the UE setting information of the Client-1 are saved in the same setting file. The user identifier and the user setting information of the user are bindingly saved.

As a preferred solution, the method further includes the following steps.

Step 103: The XDMS returns an answer message to the XDMC-1.

For the Client-2, similar steps are performed.

Step 104: The XDMC-2 sends an XCAP PUT message to an XDMS, which is adapted to upload UE setting information of the Client-2, a UE identifier of the Client-2, user setting information of the user, and a user identifier.

Step 105: The XDMS bindingly saves the UE identifier of the Client-2 and the UE setting information of the UE-2, and bindingly saves the user identifier and the user setting information of the user.

As a preferred solution, the method further includes the following steps.

Step 106: The XDMS returns an answer message to the XDMC-2.

Due to the binding saving, the user setting information of the user, the UE setting information of the UE-1, and the UE setting information of the UE-2 may be distinguished by the user identifier, the UE identifier of the UE-1, and the UE identifier of the UE-2, respectively.

In this manner, the UE setting information can be found according to the UE identifier, and service operations are performed according to the user setting information.

Seen from the above embodiment, in a scenario that a plurality of UEs is applied in services, service settings may be classified into service settings for the user and service settings for the equipment. The setting information about a user may be saved as a single piece of data information; while the setting information about several UEs needs to be saved as UE setting information of different UEs respectively.

Service settings for the user and service settings for the UE need to be classified. For the user setting information, all the contents about the user setting information in the prior art will be kept.

Figure 2:
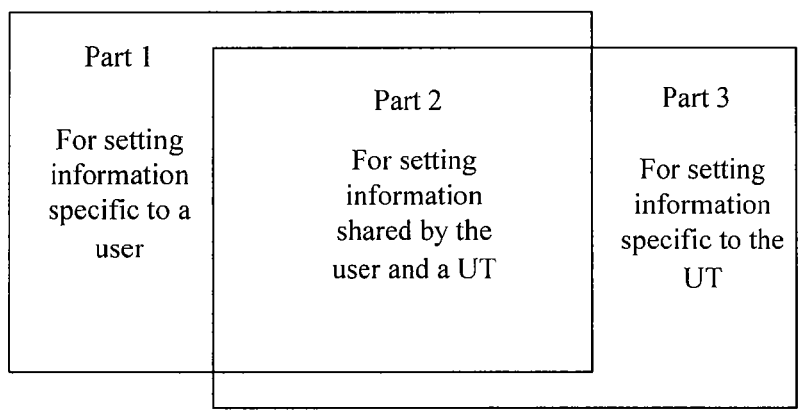
FIG. 2 is a schematic view of relations between setting information according to the first embodiment of the present invention.

Relations between the user setting information and the UE setting information are shown in FIG. 2. Part 2 indicates properties or functions that the UE setting information and the user setting information have in common. Part 1 is particularly for the user setting information (merely reflecting the user's will, and independent of the use of a certain UE, such as an answer mode), which may be saved only as a part of the user setting information. Part 3 is particularly for the UE setting information (for example, UTs with a camera and without a camera surely support different media types), which may be saved only as a part of the UE setting information. Therefore, the user setting information includes Part 1 and Part 2, and the UE setting information includes Part 2 and Part 3. The user setting information may include all of or a part of the UE setting information.

In a second embodiment of the present invention, an equipment service setting method is provided. This embodiment illustrates a situation that two UTs, namely, Client-1 and Client-2, belonging to the same user are registered with an internet protocol (IP) multimedia subsystem (IMS) network, and service settings are carried out. In this embodiment, when the Client-1 is registered with the IMS network, a globally routable user agent (UA) uniform resource identifier (URI) (GRUU) is adopted as a globally routable identifier for UE, that is, a UE identifier. When the Client-2 is registered with the IMS network, a GRUU is adopted as a globally routable identifier for UE, that is, a UE identifier. Both the Client-1 and the Client-2 are UTs of the user using this service. The two terminals have different capabilities, but both can upload setting information to an application server (AS) by using a session initiation protocol (SIP) Publish message and carry out service settings as well.

It should be noted that, the identifier for distinguishing UEs in the present invention is not limited to the GRUU as long as it can distinguish the UEs, and may also be other equipment identifiers, such as identifiers that carry a media access control (MAC) address, physical address, automatically generated sequence number, or other essential elements.

Figure 3:
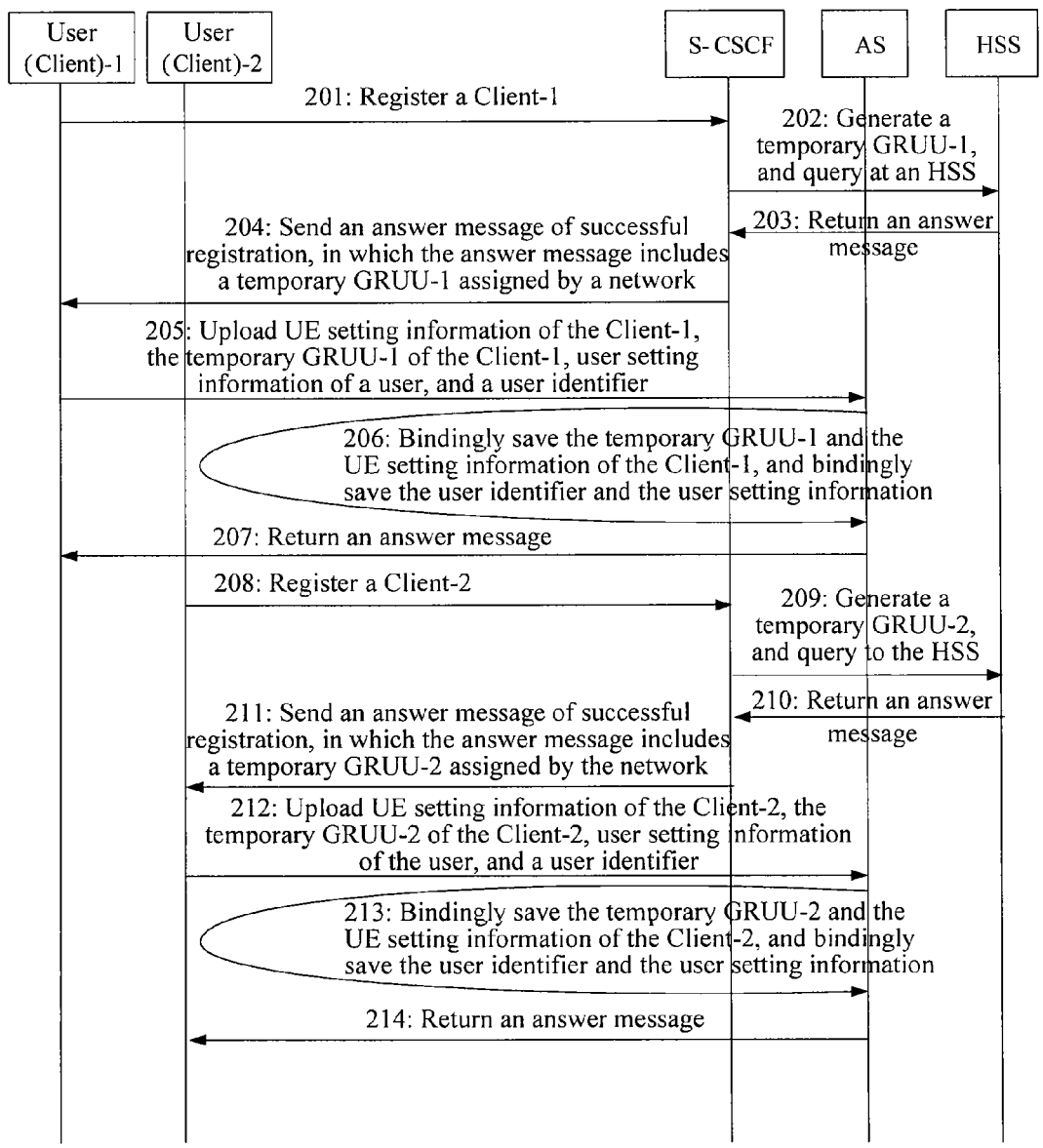
FIG. 3 is a flow chart of a method according to a second embodiment of the present invention.

This embodiment is a typical application scenario, such as an open mobile alliance (OMA) push to talk over cellular (PoC) service or a presentation service. The process of the method is shown in FIG. 3, which includes:

Step 201: The Client-1 first initiates a registration request to a serving-call session control function (S-CSCF). During the registration, a mechanism of internet engineering task force (IETF) GRUU draft is employed. Information that supports the GRUU is identified in the registration message. A temporary GRUU-1 of the UT generated by the S-CSCF serves as a UE identifier, which is adapted to uniquely identify the Client-1.

Step 202: The S-CSCF receives the registration request of the user, generates the temporary GRUU-1, and queries at a home subscriber server (HSS).

Step 203: The HSS returns an answer message to the S-CSCF.

Step 204: The S-CSCF sends an answer message of successful registration to the Client-1. The answer message carries the temporary GRUU-1 assigned by the network.

According to characteristics of the service, the UT may initiate service settings to the AS immediately upon finishing the service registration. In this process, Step 205 is performed.

Step 205: The Client-1 sends an SIP PUBLISH message to the AS serving as a service setting saving entity in the network. The SIP PUBLISH message is adapted to upload setting information for service settings. The SIP PUBLISH message includes a user identifier URI and the temporary GRUU-1 of the Client-1. The setting information uploaded by the Client-1 includes user setting information as well as UE setting information about the Client-1.

As the setting information is saved on the AS, and usually has a certain life cycle, and therefore, aging times are respectively set for the user setting information and the UE setting information. In such an SIP PUBLISH message, the aging time of the user setting information and that of the UE setting information may be the same or different.

As the UE setting information may be a part of the user setting information, when the user setting information is aged, the network equipment also needs to clear the UE setting information of the Client-1 besides the user setting information, on condition that the aging time of the UE setting information about the Client-1 and that of the Client-2 are the same.

When the UE setting information of the Client-1 is aged, the network equipment clears the UE setting information of the Client-1 without affecting the UE setting information and the user setting information of the Client-2, that is, the UE setting information and the user setting information of the Client-2 will not be cleared.

When the aging time of the UE setting information is updated, the aging time of the user setting information is updated at the same time.

When the aging time of the UE setting information is updated, the aging time of the user setting information may not be updated due to service logic (for example, the aging time of the user setting information is longer than the next aging time that needs to be updated).

When the user updates the user setting information initiatively, the user may not update the aging time of the UE setting information.

For a situation of using a permanent Public GRUU instead of a temporary GRUU generated by the network during the registration, the GRUU carried in the SIP PUBLISH message is a Public GRUU, i.e., a public identifier.

Step 206: The AS bindingly saves the user setting information and the user identifier URI, and bindingly saves the UE setting information of the Client-1 and the GRUU-1 obtained by the UT.

The setting information uploaded by the Client-1 is classified into the user setting information and the UT setting information. The UE setting information is a part of the user setting information. The user setting information adopts the user identifier URI; while the UE setting information of the Client-1 adopts the GRUU-1 obtained by the UT.

Step 207: The AS returns a success answer message to the Client-1.

Afterward, like the Client-1, the Client-2 performs similar Steps 208 to 214, which will not be described herein again.

At this point, the AS saves the user setting information, the UE setting information of the Client-1, and the UE setting information of the Client-2. Both of the Client-1 and the Client-2 are a part of the whole set of service settings. The user setting information adopts the user identifier URI; while the UE setting information of the Client-1 and that of the Client-2 adopt the GRUU-1 and GRUU-2 obtained by the Client-1 and the Client-2, respectively.

In order to further solve a problem of low security in the process that the AS receives an SIP PUBLISH message about service settings, a service setting method is provided in a third embodiment of the present invention. In this embodiment, a process of third party registration is added before the AS receives the SIP PUBLISH message about the service settings. During the process of the third party registration, the AS serving as a third party verification entity obtains a user identifier URI. Moreover, in the process of the third party registration, a third party registration request sent to the AS by an S-CSCF carries a GRUU (a temporary GRUU or a Public GRUU). Thereby, the AS obtains a UE identifier in the process of the third party registration. The UE identifier is a GRUU in this embodiment.

Figure 4:
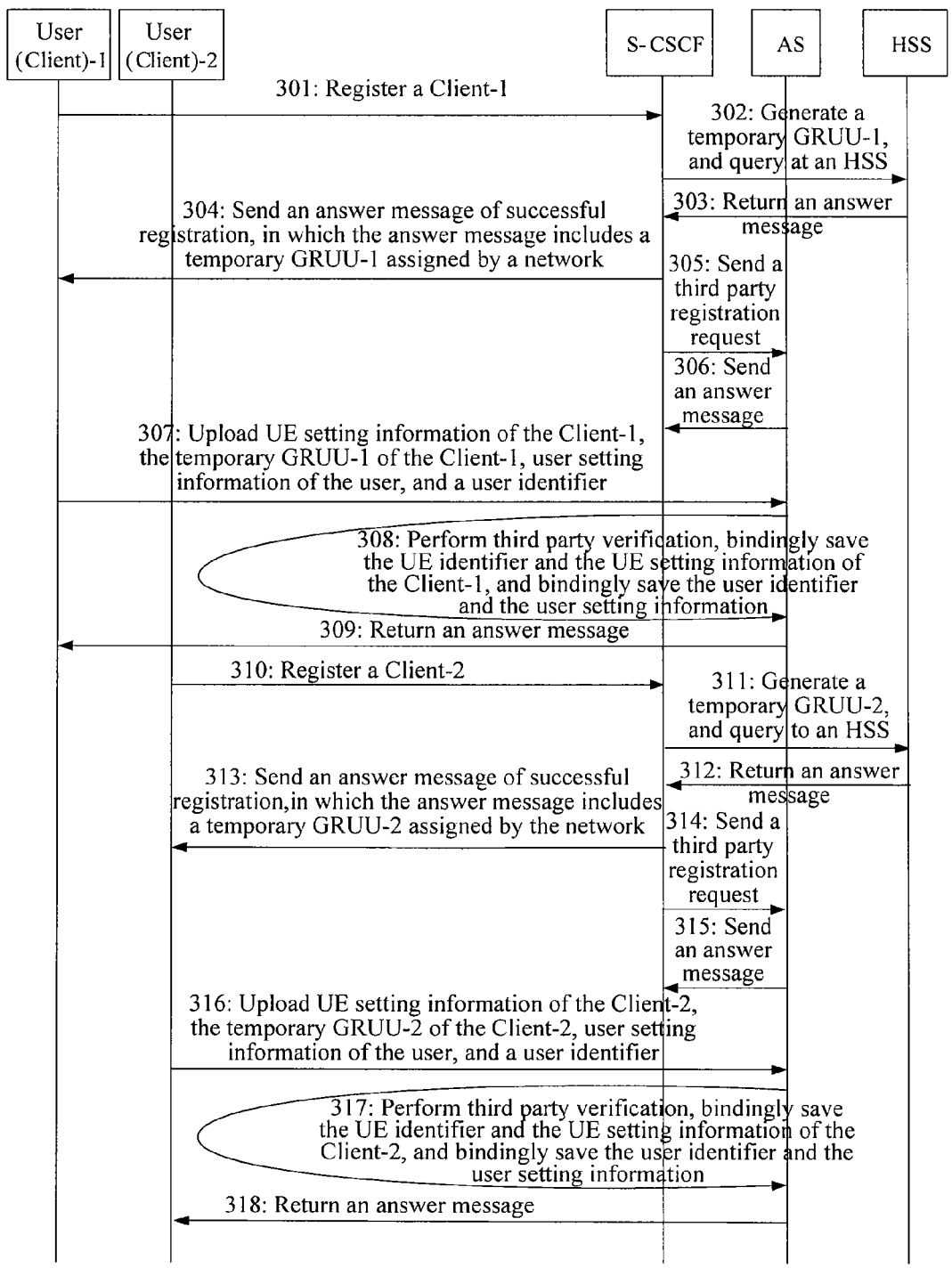
FIG. 4 is a flow chart of a method according to a third embodiment of the present invention.

For the Client-1, the specific process of the method is shown in FIG. 4. Steps 301 to 304 are the same as Steps 201 to 204 in the second embodiment. Service settings are not initiated to the AS immediately upon finishing Step 204, that is, after the completion of the service registration, but instead, the AS obtains the UE identifier. The process of the third party registration is performed in this embodiment, and the UT may carry out the following steps after finishing the service registration.

Step 305: An S-CSCF sends a third party registration request to the AS (here, the AS serves as the third party verification entity). The third party registration request carries a user identity URI and a UE identifier GRUU (a temporary GRUU or a Public GRUU).

Step 306: The AS receives the third party registration request, and sends an answer message in response to the third party registration request to the S-CSCF.

It should be noted that, the AS may send a request for obtaining the UE information to the S-CSCF, and the S-CSCF returns the UE identifier to the AS.

Step 307: The setting information is uploaded for the service settings. That is, a step the same as Step 205 in the second embodiment is performed.

Step 308: After the AS receives the setting information uploaded by the Client-1, in order to enhance the security of the service setting process, the service settings may be verified. The AS verifies and compares the user identity URI and the UE identifier GRUU received in the service setting process by using the user identity URI and the UE identifier GRUU received in the third party registration process, and those passing the verification are accepted. Besides, the AS saves the service setting information, in which the user setting information and the user identifier URI are bindingly saved, and the UE setting information of the Client-1 and the GRUU-1 obtained by the UT are bindingly saved.

Step 309: The AS returns a success answer message to the Client-1.

In the above embodiment, the AS not only serves as a service setting saving entity, but also as a third party verification entity. The service setting saving entity and the third party verification entity may also be realized by different network entities, which will not be described herein again.

For the Client-2, Steps 310 to 318 similar to the steps above are performed.

In view of the above, as the process of the third party registration is adopted, before receiving the service setting request, the AS first obtains from a third party identifiers adapted to identify the setting information (the user setting information and the UE setting information), i.e., the user identity URI and the UE identifier GRUU. Then, by adding a process of verifying the identifiers, the AS prevents setting information from being maliciously uploaded thereto by anonymous UTs, thus enhancing the network security.

Figure 5:
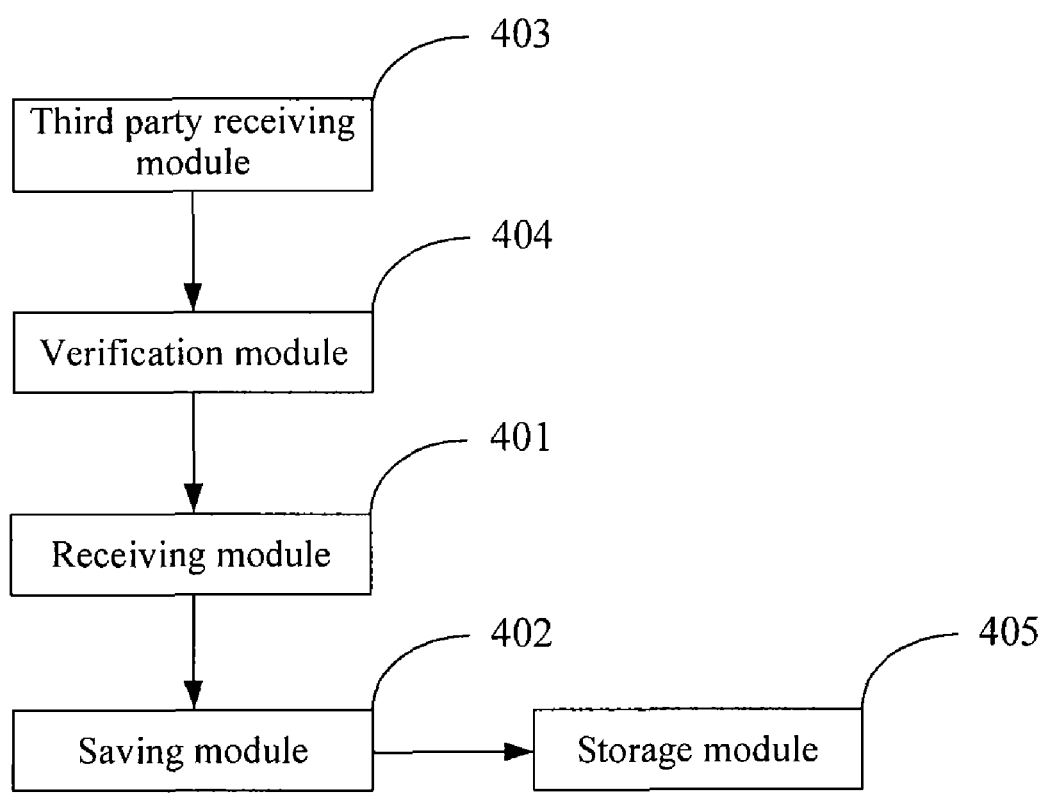
FIG. 5 is a structural view of a service setting saving entity according to a fourth embodiment of the present invention.

In a fourth embodiment of the present invention, a service setting saving entity is provided. The structure of this saving entity is shown in FIG. 5, which includes:

a receiving module 401 adapted to receive user setting information, user identifiers, UE setting information, and UE identifiers uploaded by UTs belonging to the same user; and a saving module 402 adapted to bindingly save the user setting information and the user identifiers, and bindingly save the UE identifier and the UE setting information of the same UT.

The service setting saving entity further includes:

a third party receiving module 403 adapted to receive a user identifier and a UE identifier sent by a CSCF; and a verification module 404 adapted to verify the user identifiers and the UE identifiers uploaded by the UTs according to the user identifier and the UE identifier obtained from the CSCF by the third party receiving module 403.

The service setting saving entity further includes a storage module 405 adapted to store aging time respectively set for the user setting information and the UE setting information received by the receiving module 401.

The functions realized by an S-CSCF in the above embodiments may be accomplished by other CSCFs.

Moreover, in an embodiment of the present invention, a service setting method is also provided, and the method includes the following:

a service setting saving entity receives setting information sent by UTs belonging to the same user, in which the setting information includes equipment identifiers; and the service setting saving entity saves the setting information.

In addition, the setting information further includes a user identifier.

Meanwhile, in an embodiment of the present invention, a service setting saving entity is also provided. The service setting saving entity includes:

a receiving module adapted to receive setting information sent by UTs belonging to the same use, in which the setting information includes equipment identifiers; and a saving module adapted to save the setting information.

In view of the above, the service setting method and the service setting saving entity save a plurality of equipment identifiers, and each equipment identifier is adapted to distinguish different equipments, so that the equipments can be set distinctively in a scenario that one user has several equipments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A service setting method, comprising:
receiving, by a call session control function (CSCF), service registration requests of user terminals (UTs), and sending answer messages of successful registration to the UTs;
receiving, by a third party verification entity, a user identifier and user equipment (UE) identifiers sent by the CSCF;
receiving, by a service setting saving entity, user setting information, a user identifier, UE setting information, and UE identifiers uploaded by UTs of the same user;
after the receiving, by the service setting saving entity, of the user setting information, the user identifier, the UE setting information, and the UE identifiers uploaded by the UTs, verifying, by the third party verification entity, the user identifier and the UE identifiers uploaded by the UTs according to the user identifier and the UE identifiers obtained from the CSCF; and
when verified bindingly saving, by the service setting saving entity, the user setting information and the user identifier, and bindingly saving the UE identifier and the UE setting information of the same UT.

2. The method according to claim 1, wherein the user setting information comprises setting information shared by the user and the UTs, and setting information only specific to the user.

3. The method according to claim 2, wherein the UE setting information is in the user setting information.

4. The method according to claim 1, wherein the UE setting information comprises setting information shared by the user and the UTs, and setting information only specific to the UTs.

5. The method according to claim 1, wherein temporary UE identifiers assigned for the UTs are comprised in the answer messages.

6. The method according to claim 1, wherein the UE identifiers are permanent identifiers.

7. The method according to claim 6, wherein the permanent identifiers are common identifiers of the UEs.

8. The method according to claim 1, wherein aging times of the user setting information and aging time of the UE setting information are set.

9. The method according to claim 8, wherein the aging time of the user setting information and the aging time of the UE setting information are the same or different.

10. The method according to claim 8, wherein the aging time of respective UE setting information is the same, and when the user setting information reaches the aging time and is cleared, the UE setting information is also cleared; or when one UE setting information reaches the aging time and is cleared, other UE setting information and the user setting information are not cleared.

11. The method according to claim 8, further comprising: updating the aging time; and
when updating the aging time of the UE setting information, updating or not updating the aging time of the user setting information.

12. The method according to claim 8, further comprising: updating the user setting information; and
when updating the user setting information, not updating the aging time of the user setting information.

13. A service setting saving entity, comprising:
a receiving module, adapted to receive user setting information, a user identifier, user equipment (UE) setting information, and UE identifiers uploaded by user terminals (UTs) of the same user; and
a saving module, adapted to when verified bindingly save the user setting information and the user identifier, and bindingly save the UE identifier and the UE setting information of the same UT;
a third party receiving module, adapted to receive a user identifier and UE identifiers sent by a call session control function (CSCF); and
a verification module, adapted to verify the user identifier and the UE identifiers uploaded by the UTs according to the user identifier and the UE identifiers obtained from the CSCF by the third party receiving module.

14. The service setting saving entity according to claim 13, further comprising:
a storage module, adapted to store aging times set for the user setting information and the UE setting information received by the receiving module.

* * * * *